United States Patent
Maxwell et al.

(10) Patent No.: US 6,793,235 B2
(45) Date of Patent: Sep. 21, 2004

(54) HITCH GUIDE

(76) Inventors: Bobby Maxwell, P.O. Box 65, Ruleville, MS (US) 38771; Robert Maxwell, P.O. Box 65, Ruleville, MS (US) 38771

(*) Notice: Subject to any disclaimer, the term of this patent is extended or adjusted under 35 U.S.C. 154(b) by 7 days.

(21) Appl. No.: 10/274,259

(22) Filed: Oct. 18, 2002

(65) Prior Publication Data

US 2003/0075899 A1 Apr. 24, 2003

Related U.S. Application Data

(60) Provisional application No. 60/345,257, filed on Oct. 20, 2001.

(51) Int. Cl.[7] .................................................. B60D 1/40
(52) U.S. Cl. ....................................................... 280/477
(58) Field of Search ......................... 280/477; 410/103, 410/118

(56) References Cited

U.S. PATENT DOCUMENTS

| | | | | |
|---|---|---|---|---|
| 5,961,263 A | * | 10/1999 | Nunez | 410/103 |
| 6,089,590 A | * | 7/2000 | Bowers | 280/477 |
| 6,655,887 B2 | * | 12/2003 | McDonald | 410/118 |
| 2002/0100175 A1 | * | 8/2002 | King | 33/264 |

* cited by examiner

*Primary Examiner*—Lesley D. Morris
*Assistant Examiner*—Daniel Yeagley
(74) *Attorney, Agent, or Firm*—Gordon E. Baird

(57) ABSTRACT

A hitch guide is a device to aid the driver of a pickup truck in mounting a gooseneck trailer hitch onto the hitch ball mounted in the bed of a pickup truck. the present device has a strap mounted between tow end pieces which in turn mount on the side rails of a pickup truck bed to that the end pieces may be moved along the length of the pickup truck bed for adjustment purposes. A marker, mounted on the strap, may be adjusted laterally between the two pickup bed rails. When the strap and marker are properly adjusted, the pickup truck when backed up to the mounting pole of a gooseneck trailer so that the marker is just touching the mounting pole will be oriented so that the mounting pole and gooseneck trailer hitch are aligned directly over the hitch ball in the pickup truck bed.

12 Claims, 8 Drawing Sheets

HITCH GUIDE

CROSS REFERENCE TO RELATED APPLICATIONS

This application is for the same invention as set forth in Provisional Patent Application No. 60/345,257 with a filing date of Oct. 20, 2001. The priority of this previous filing is claimed.

STATEMENT REGARDING FEDERALLY SPONSORED RESEARCH OR DEVELOPMENT

Not Applicable.

REFERENCE TO A "Microfiche Appendix"

Not applicable.

BACKGROUND OF THE INVENTION

1. Field of the Invention

This invention relates generally to a guide for guiding a gooseneck trailer hitch onto a hitch ball.

2. Description of Related Art

It is a difficult task to connect a pickup truck or other towing vehicle to the hitch of any trailer, most specifically when connecting to the hitch of a gooseneck trailer. The ball mount for use with a gooseneck trailer is mounted centrally in the bed of a pickup truck causing the driver of the truck to be unable to clearly view the ball mount or the trailer hitch in regard to connecting the two for towing purposes. The additional size of modern pickup trucks, along with the extra cab length now common, only adds to this difficulty. Furthermore, due to the substantial size and weight of most gooseneck type trailers with a large percentage of their weight on the tongue, it is extremely important that the ball mount and the trailer hitch be exactly aligned since it is very difficult to move the trailer laterally, forward or rearward for any adjustment.

This being said, the products and prior art solutions presented for the solution of this problem all fall short in one or more areas. They are either too complicated, too costly to produce, too heavy or too bulky to easily store. An optimal solution will avoid all of these problems, i.e., it must be simple to use by anyone on any truck or any gooseneck type trailer; it must be inexpensive to produce, manufacture, and distribute; it must be lightweight and conveniently stored. Examples of prior art are set out below.

In U.S. Pat. No. 6,120,052 an optically guided trailer hitching system employs light beams of different colors to aid a user in putting a trailer hitch onto a hitch ball. In U.S. Pat. No. 6,076,847 a mirror mounted upon a post attached to the trailer is employed to to aid a user in putting a trailer hitch onto a hitch ball. In U.S. Pat. No. 6,179,318 B1 a funnel shaped guide is used to guide the trailer hitch onto the hitch ball. In U.S. Pat. No. 6,100,795 a transmitter unit employing electronic circuitry and left and right indicators is used to guide a trailer hitch to a position over a ball. None of these patents, however, whether taken alone or in proper combination, show the trailer hitch guide of the present invention.

BRIEF SUMMARY OF THE INVENTION

A hitch guide is described for use in guiding the hitch ball mounted in the bed of a pickup truck into alignment with the gooseneck trailer hitch. The hitch guide is temporarily mounted, by means of a magnetic attachment, on the side rails of the bed of the pickup truck and comprises a nylon strap holding the ball mount guide marker in a manner so that the marker may be adjustably positioned along the strap, means for tightening the strap, and end pieces attached to the ends of the strap which are positioned above each wheel well and adjusted laterally along the length of the bed rails so that the guide marker will just physically touch the vertical post of the gooseneck trailer hitch when it is directly above the ball mount in the bed of the pickup truck. Once the trailer guide is properly aligned, the position of the ends of the guide may be marked on the inside of the bed rail with indelible ink so as to allow the exact re-placement of the trailer hitch guide whenever one is ready to connect the pickup truck to a gooseneck trailer hitch.

It is a principal object of this invention to provide an improved hitch guide.

Another object of this invention is to provide a hitch guide for use in guiding the hitch ball mounted in the bed of a pickup truck into alignment with a gooseneck trailer hitch.

Another object of this invention is to provide a hitch guide which may be easily mounted on a pickup truck without modification thereof.

Another object of this invention is to provide a hitch guide which is easily and readily viewed from the cab or driver's position of a truck without assistance from another person and without other external aids.

Another object of this invention is to provide a hitch guide which is conveniently stored so as to make it more accessible and agreeable for use.

Another object of this invention is to provide a hitch guide which is economical to produce.

BRIEF DESCRIPTION OF THE SEVERAL VIEWS

DETAILED DESCRIPTION OF THE INVENTION

Figure 1:
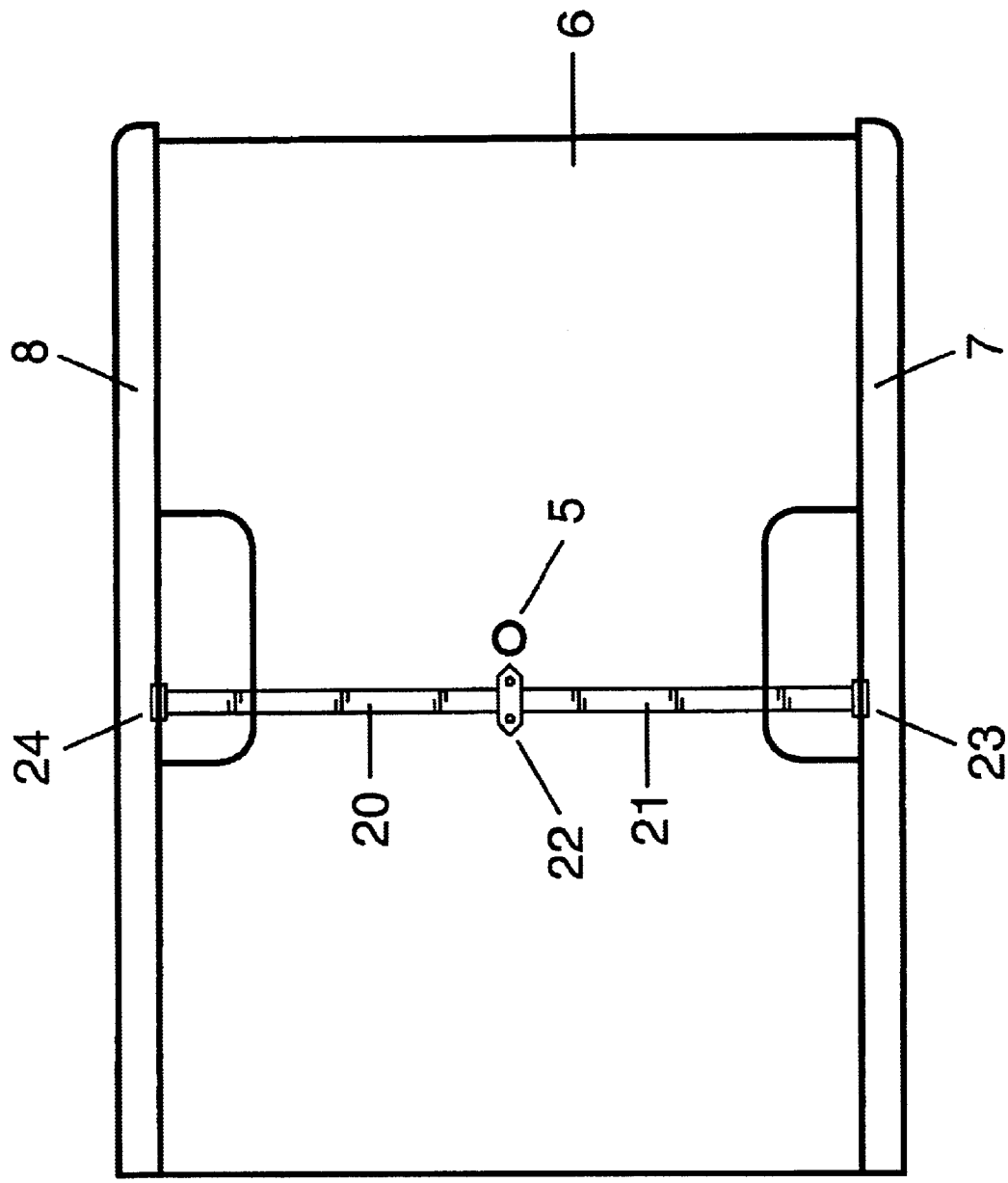
FIG. 1 is a top view showing the hitch guide and its relation to the ball mounted in the bed of a pickup truck.
Figure 2:
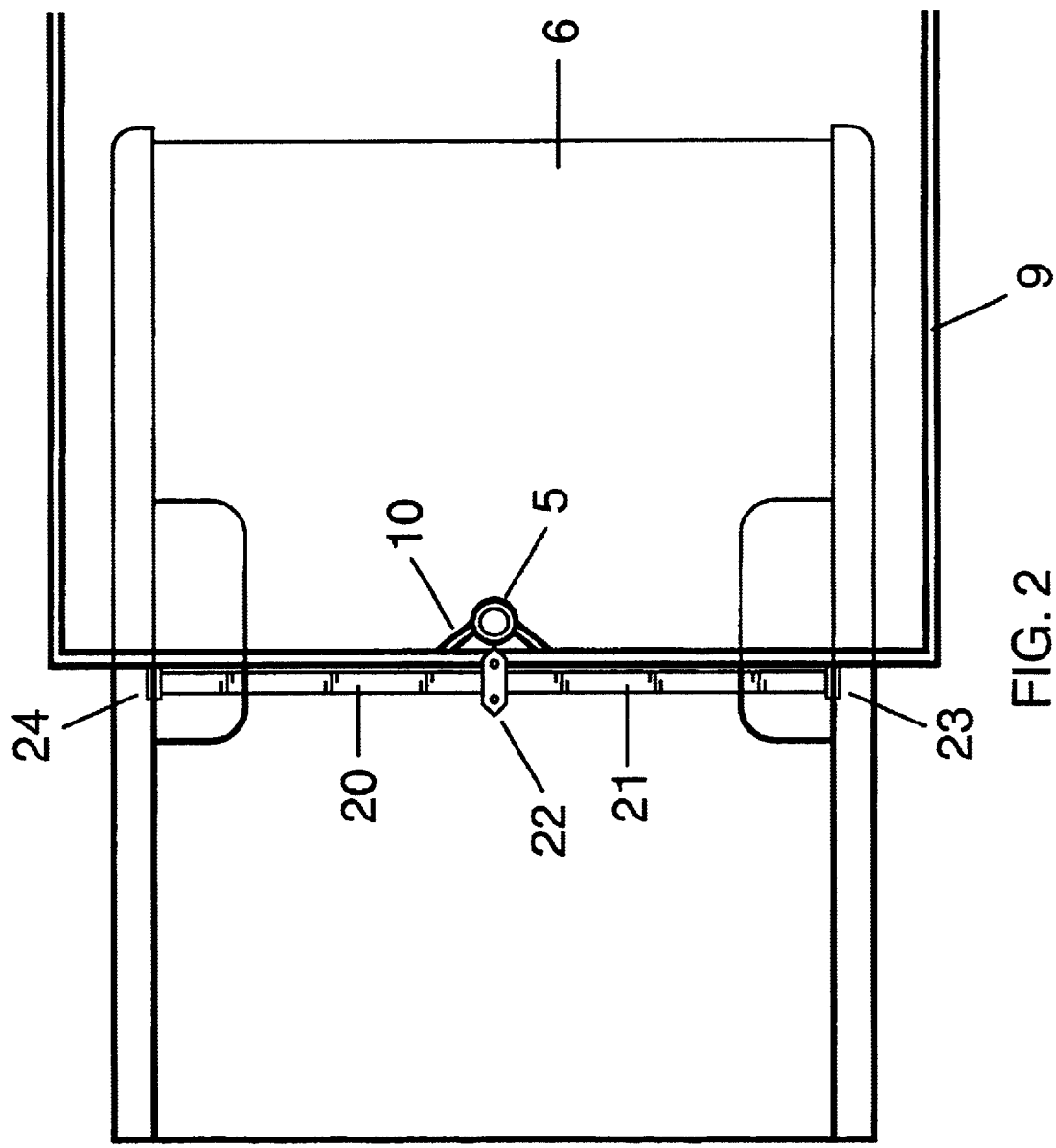
FIG. 2 is a top view showing the relationship of the hitch guide with the gooseneck of a gooseneck trailer installed upon the ball of FIG. 1.

In FIGS. 1 and 2, numeral 5 refers to a hitch ball mounted in a pickup bed 6 having first bed side rail 7 and second bed side rail 8. Numeral 9 refers generally to the gooseneck trailer while numeral 10 refers to the vertical post of the gooseneck trailer hitch. Numeral 20 refers generally to the hitch guide; numeral 21 refers to the strap of the trailer hitch guide; numeral 22 refers generally to the marker of the hitch guide, while numerals 23 and 24 refer to the first end piece and second end piece respectively which are attached to the ends of the strap.

Figure 3:
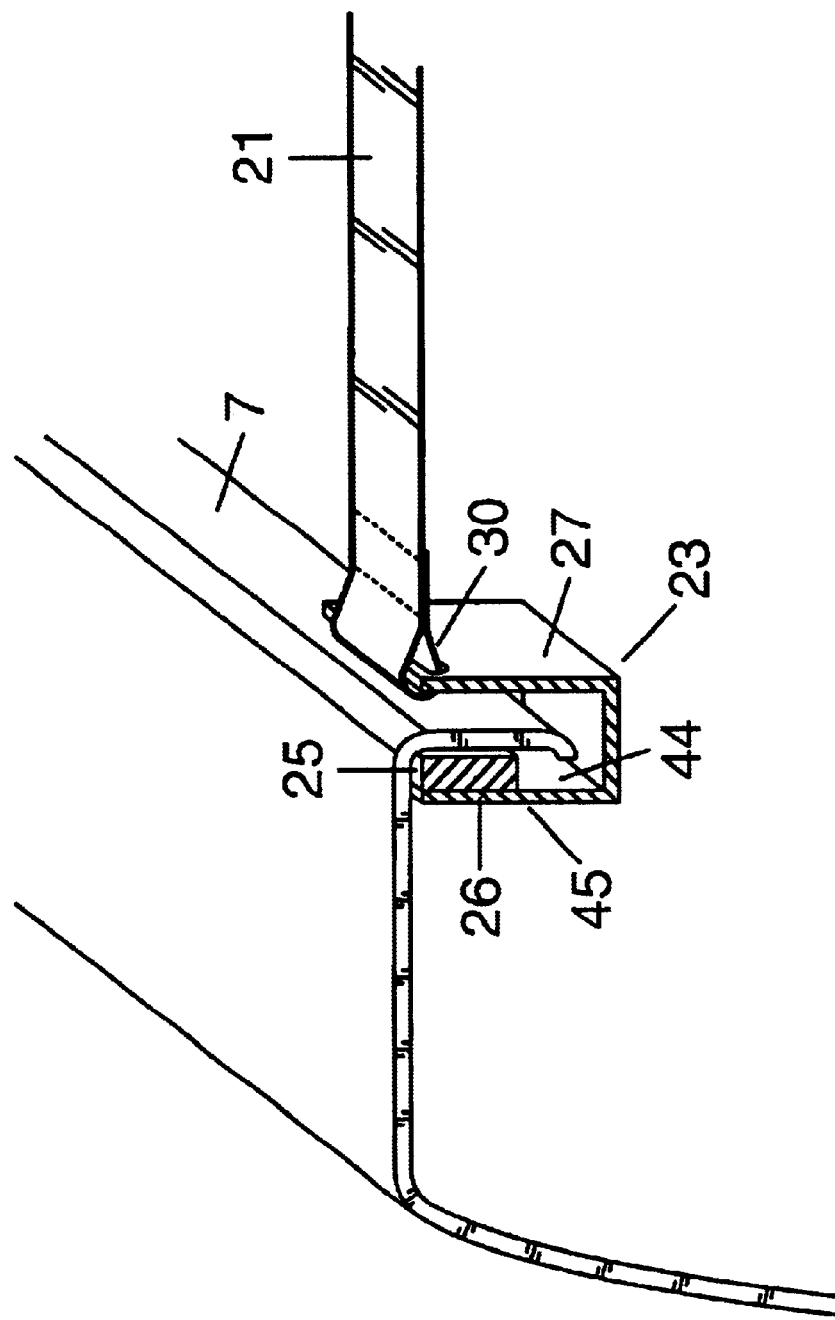
FIG. 3 is a sectional view showing the mounting of the hitch guide on a pickup truck bed rail.

In FIG. 3 a cut away drawing shows the first end piece 23 which has a U-shape having first side 26 and second side 27. The end piece is made from aluminum channel stock of a suitable thickness. The first side has an inner surface 44 and an outer surface 45. First magnet 25 is affixed to the inner surface of the first side. The first end piece is attached by means of magnetic attraction against the first pickup bed rail 7 while the trailer hitch guide is being adjusted to fit the pickup bed rails. The magnet is an alnico magnet attached with adhesive to the first side of the U-shaped end piece. Alternatively the magnet could be made plastic strip materials that are magnetized and have an adhesive backing which can us used to attach a piece of the strip to the U-shaped end piece. Such magnets do not hold as strong a magnetic field as the alnico magnets, but the magnetized plastic strips come in rolls of material which can easily be cut and affixed to the end piece.

Figure 4:
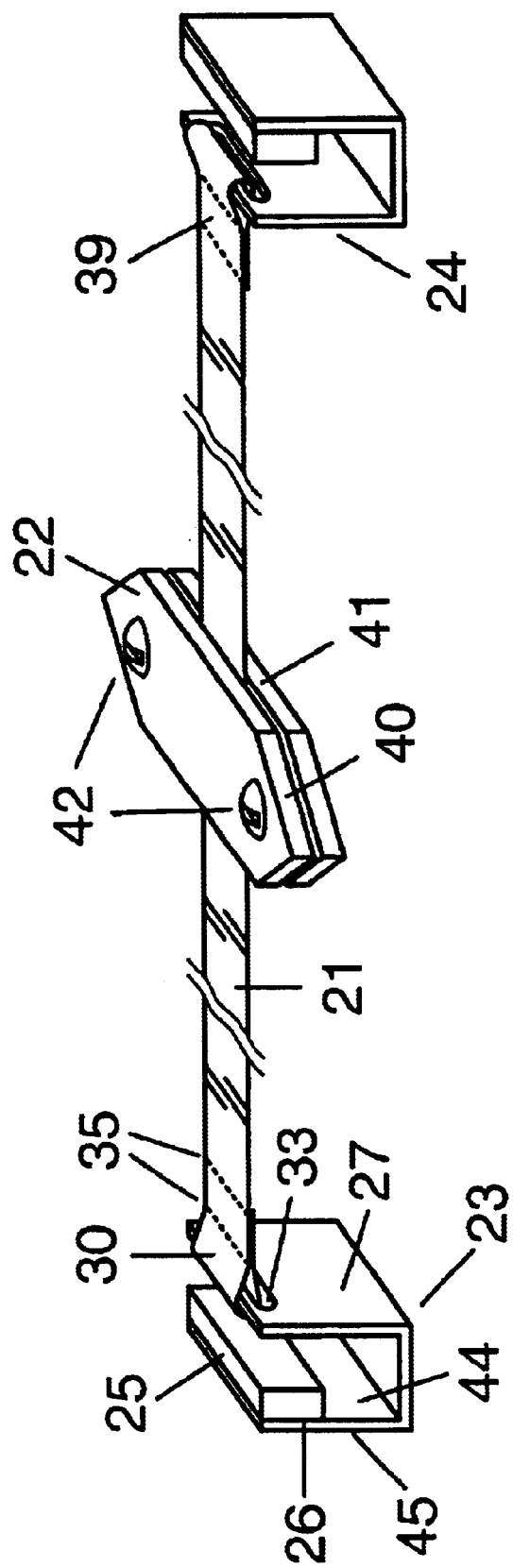
FIG. 4 shows the hitch guide in its entirety.

FIG. 4 shows first strap end 30 looped through first slot 33 formed in second side 27 of first end piece 23. The first strap end is secured by stitches 35 back onto the strap thus securing the strap to the first end piece. The second end 39 of the strap is similarly secured to second end piece 24. Marker 22 is formed of upper half 40 and lower half 41; upper half and lower half are secured together, with strap 21 between them, by screws 42. The marker halves have been made of a one-quarter inch thick polypropolene plastic. The marker can be moved to a desired position on the strap and then secured to the strap by tightening screws 42.

Figure 5:
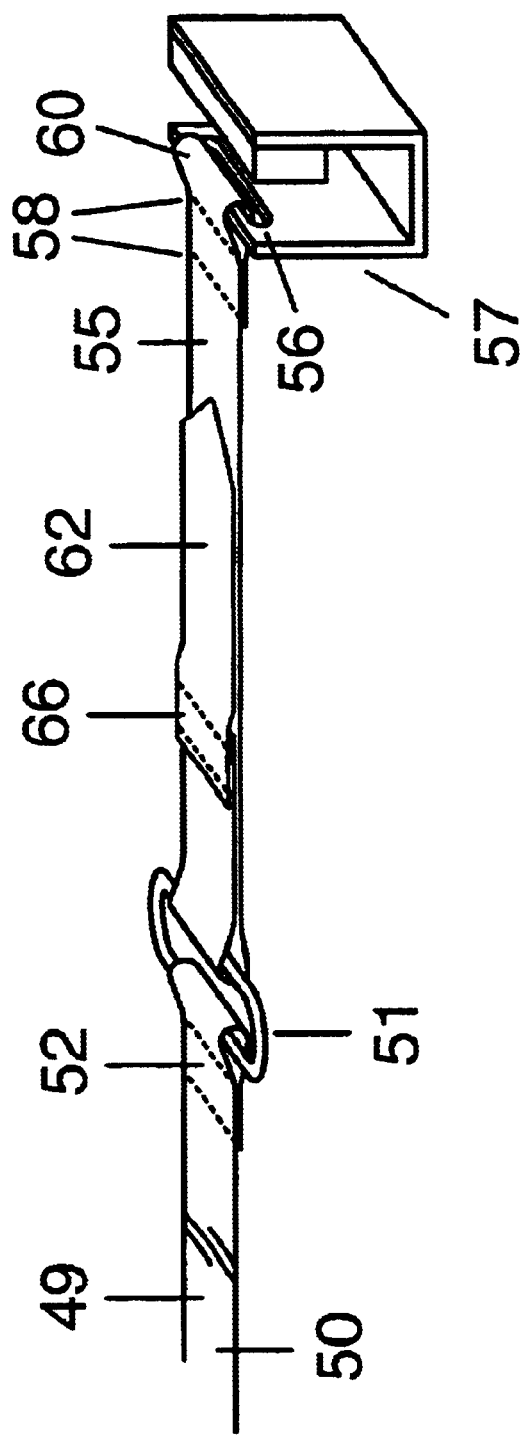
FIG. 5 shows the adjustment mechanism for adjusting the hitch guide to fit the width of any pickup truck bed.

FIG. 5 details the preferred method for tensioning the strap once the hitch guide has been positioned by adjusting the magnet positions along the lengths of the bed rails and by roughly positioning the marker. Strap 49 is comprised of first strap portion 50 which is looped through oval ring 51 and sewn onto itself with stitches 52. Second strap portion 55 has its first end 60, which is made of loop type velcro, looped through the second slot 56 in second end piece 57 and sewn to itself with stitches 58. The second end 62 of the second strap portion is made of hook type velcro and is sewn to the first end with stitches 66 so that the hooks of the second end of the second strap portion are opposite the loops of the first end of the second strap portion. The second end of the second strap portion after being looped through the oval ring may be affixed first end by pressing the hook type velcro against the loop type velcro. The strap may be tensioned by pulling second end 62 through the oval ring and fixing it in place with the velcro closure system with a suitable tension on the strap. The first strap portion is made from one-inch wide by one-sixteenth thick polypropolene webbing with a rating of two hundred fifty pounds breaking strength; the oval ring is plastic with a two hundred fifty pounds breaking strength rating; the second end of the strap is made of one inch wide commercial grade velcro having a rating of 250 pounds breaking strength.

Figure 6:
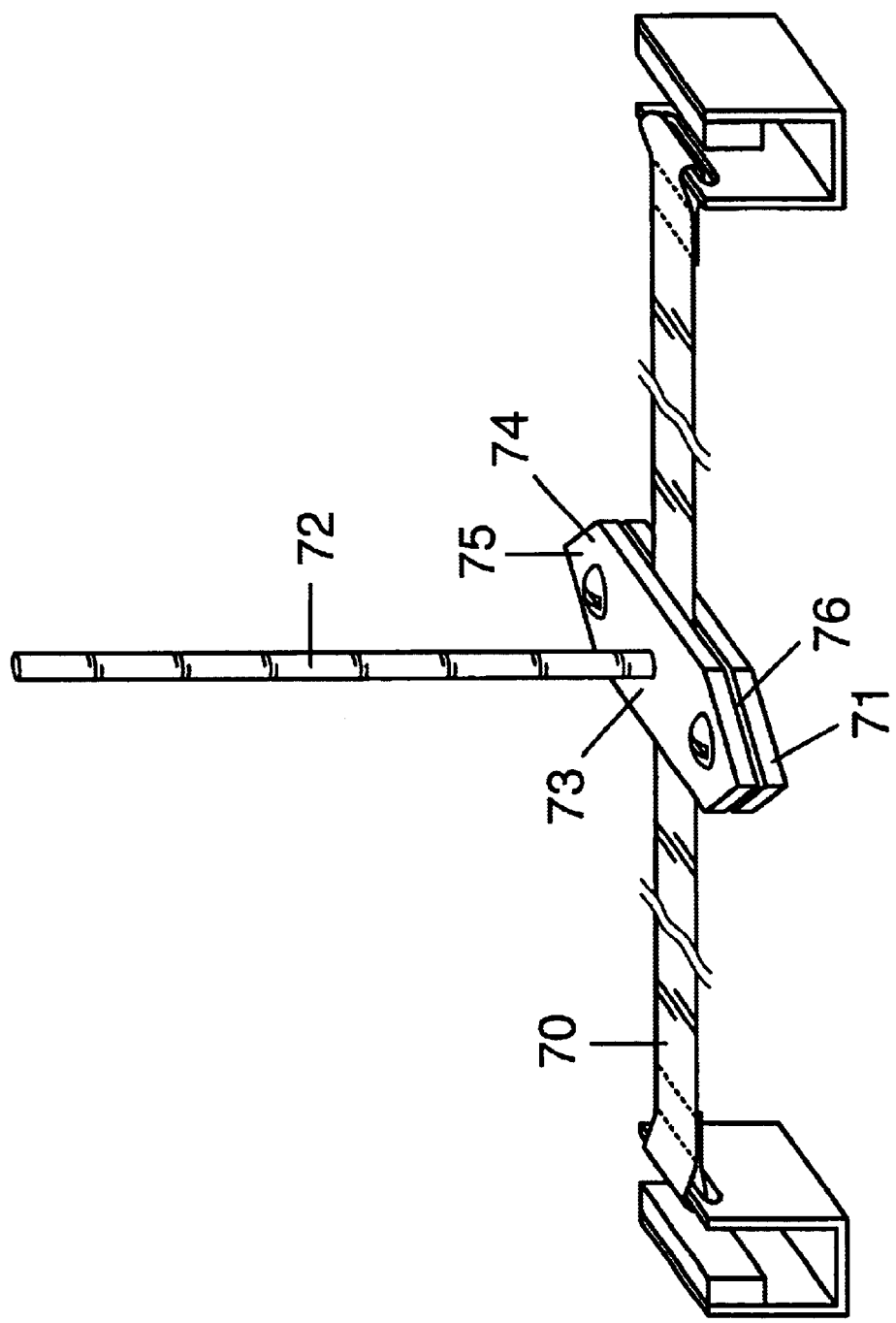
FIG. 6 illustrates and embodiment having a staff mounted on the marker in order to improve visibility when the view of the hitch is obstructed by objects in the bed such as tool boxes.

FIG. 6 details a second embodiment of the hitch guide for use when the operator is unable to view the hitch guide marker from the driver's seat of a pickup truck due to an obstruction. Numeral 70 refers to the hitch guide on which marker 71 is mounted. Upper half 74 of the marker has top surface 75 and bottom surface 76. Staff 72 is affixed in hole 73 in the upper half of the marker and points perpendicularly away from from the top surface of said uper half. The staff enables a driver to align the ball in the pickup truck bed with the gooseneck trailer by aligning the staff with the vertical pole on the gooseneck trailer.

Figure 7:
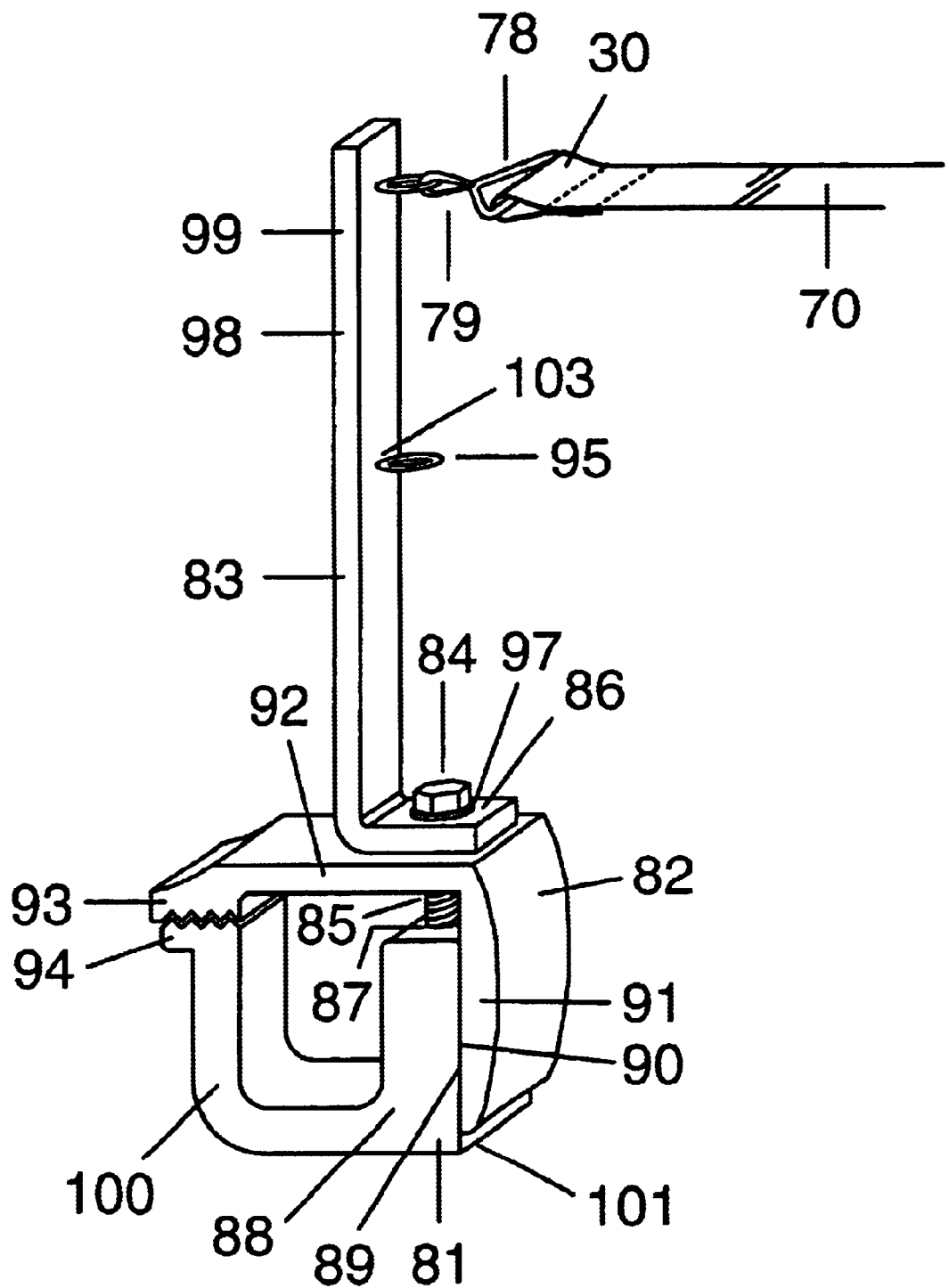
FIG. 7 shows a second embodiment whereby the trailer hitch guide may be elevated with respect to the pickup truck bed.

FIG. 7 details a third embodiment of the hitch guide again is designed for use when a driver's view is obstructed. Numeral 99 indicated the hitch guide generally. Clamp 101 is a commercially available product from Great Creations of Napanee, Ind. and is covered by U.S. Pat. No. 5,131,780. The clamp consists of U-bracket 81, right angle bracket 82, and bolt 84. Bolt 84 passes through hole 85 in said right angle bracket thence into threaded hole 87 in first wall 88 said U-bracket. Outer surface 89 of said first wall is held in close proximity to inner surface 90 of leg 91 of said right angle bracket when the bolt is secured in said threaded hole. Arm 92 of said right angle bracket terminates in upper jaw 93. Second wall 100 of the U-bracket terminates in lower jaw 94. When said bolt is loose, outer surface 89 is free to slide along inner surface 90 so as to allow the upper jaw and the lower to open and shut in relation to one another. Tightening the bolt will close the upper and lower jaws together forming a clamp. L-bracket 83 comprises foot 86, foot hole 97 in said foot and finger 98 oriented at a 90 degree angle to the foot. Bolt 84 is inserted through foot hole in said L-bracket, thence through the hole in the right angle bracket and thence into the threaded hole in the first wall of the U-bracket thus securing the L-bracket to the clamp. The L-bracket contains a plurality of eyelets 95 screwed into a plurality of holes 103. Strap 76 is sewn with stitches 77 to oval loop 78 which terminates in clip 79. The clip is attached to one of the eyelets. A complete hitch guide consists of a first clamp, a first L-bracket connected to the first clamp, a second L-bracket connected to a second clamp, a strap having a first end connected to a first oval loop which terminates in a first clip; the first clip is attached to an eyelet on the first L-bracket; the strap has a second end which is connected to a second oval loop which terminates in a second clip; the second clip is attached to an eyelet on the first L-bracket. Finally a marker as is the first embodiment is attached to the strap. When first clamp is clamped onto a first pickup truck fender rail and the second clamp is clamped onto a second pickup truck fender rail the hitch guide will be properly mounted with the strap and marker in an elevated position so that the marker can be seen from the inside of the truck in order to allow the driver to align the hitch ball with the gooseneck trailer hitch.

Figure 8:
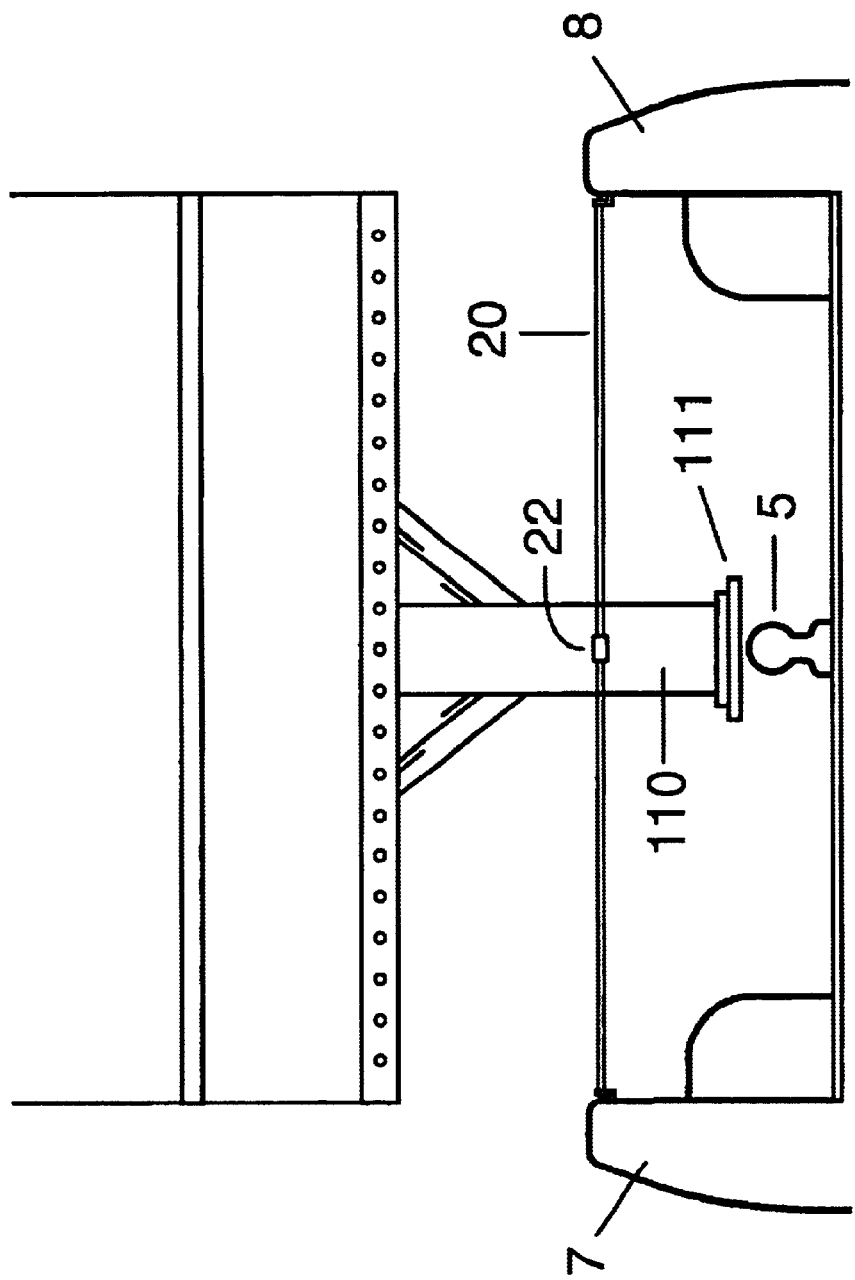
FIG. 8 is a view from the front, partially in cross section showing the relationship between the gooseneck type trailer hitch and the hitch ball when the two are properly aligned.

FIG. 8 is a view from the front showing the relationship between the gooseneck type trailer hitch and hitch ball 5 when the two are properly aligned. Hitch guide 20 is secured between first bed rail 7 and second bed rail 8. Marker 22 of the hitch guide is aligned with pole 110 of the gooseneck trailer. Hole 111 in said pole is positioned directly above the ball, so that the trailer hitch may be lower onto the ball.

What we claim is:

1. A hitch guide comprising a first end piece, first attaching means attached to said first end piece said first attaching means being adapted to attach said first end piece to a pickup truck bed rail, a second end piece, second attaching means attached to said second end piece said second attaching means being adapted to attach said second end piece to a pickup truck bed rail, a strap having a first end attached to said first end piece and a second end attached to said second end piece, a marker attached to said strap and means for positioning said marker along a length of said strap wherein said hitch guide may be mounted across a width of a pickup bed and moved lengthwise along a length of the pickup bed rails with said marker indicating a position for placement of a gooseneck trailer hitch for attachment to a gooseneck trailer hitch ball in a bed of a pickup truck.

2. A hitch guide as in claim 1 wherein said strap and a means for adjusting the length of said strap comprise first strap portion having said first end attached to the first end piece and a second end, a ring attached to the second end of the first strap portion, a second strap portion having a first end which is attached to the second end piece and a second end which is looped through said ring and attached to itself with an adjustable attaching means.

3. A hitch guide as in claim 2 wherein the adjustable attaching means for adjusting the length of said strap comprises said second strap portion having a first element composed of loop attaching means having a first end and a second end, a second element composed of hook attaching means having a first end and a second end, said first end of said first element being attached to the first end of said second element, the second end of said first element being attached to the second end of said second element wherein the first end of the second element can be inserted through the ring and secured to the first element by the hook means secured to the loop means.

4. A hitch guide as in claim 1 wherein the means for attaching the first end piece to a pickup bed comprises a first magnet attached to an inner surface of a the first side of the first end piece and the means for attaching the second end piece to a pickup bed comprises a second magnet attached to the inner surface of the first side of the second end piece.

5. A hitch guide as in claim 4 wherein the first magnet and the second magnet are alnico magnets.

6. A hitch guide as in claim 4 wherein the first magnet and the second magnet are composed of plastic magnetic strip material.

7. A hitch guide as in anyone of the claims 1, 2, 3, 4, 5 and 6 wherein the marker comprises an upper half, a lower half and a plurality of screws securing the upper half to the lower half with the strap between the upper half and the lower half wherein the marker may be moved laterally along said strap to a desired location and then secured in place with said screws.

8. A hitch guide as in claim 7 comprising said marker, whose upper half has a top surface and a bottom surface, and a staff attached to said top surface of said marker and oriented perpendicularly away from the top surface wherein a driver may align a gooseneck trailer with a ball hitch by viewing the staff if driver's view of the marker is blocked.

9. A hitch guide comprising a first clamp adapted for clamping onto a first rail of a pickup bed, a first L-bracket attached to said first clamp said L-bracket containing a plurality of first eyes, a second clamp adapted for clamping onto a second rail of a pickup bed, a second L-bracket attached to said second clamp said second L-bracket containing a plurality of second eyes, a strap having a first end attached to a first end piece and a second end attached to a second end piece, means of adjusting a length of said strap and a marker attached to said strap said marker being adjustable along the length of said strap so that said hitch guide may be positioned across a width of a pickup bed with said marker indicating a position for placement of a gooseneck trailer hitch for attachment to a gooseneck trailer hitch ball in a bed of a pickup truck.

10. A hitch guide as in claim 9 wherein said strap and means for adjusting the length of said strap comprise first strap portion having a first end attached to the first end piece and a second end, a ring attached to the second end of the first strap portion, a second strap portion having a first end which is attached to the second end piece and a second end which is looped through said ring and attached to itself with an adjustable attaching means.

11. A hitch guide as in claim 10 wherein the adjustable attaching means for adjusting the length of said strap comprises said second strap portion having a first element composed of loop attaching means having a first end and a second end, a second element composed of hook attaching means having a first end and a second end, said first end of said first element being attached to the first of said second element, the second end of said first element being attached to the second end of said second element wherein the first end of the second element can be inserted through the ring and secured to the first element by the hook means secured to the loop means.

12. A hitch guide as in anyone of the claims 9, 10, and 11 wherein the marker comprises an upper half, a lower half and a plurality of screws securing the upper half to the lower half with the strap between the upper half and the lower half wherein the marker may be moved laterally along said strap to a desired location and then secured in place with said screws.

* * * * *